United States Patent [19]

Phelps et al.

[11] Patent Number: 4,521,856

[45] Date of Patent: Jun. 4, 1985

[54] MULTIPLE THRESHOLD WHEEL SLIP CONTROL APPARATUS AND METHOD

[75] Inventors: Weldon L. Phelps, Dunlap; Alan L. Stahl, Peoria, both of Ill.

[73] Assignee: Caterpillar Tractor Co., Peoria, Ill.

[21] Appl. No.: 605,757

[22] Filed: May 1, 1984

[51] Int. Cl.$^3$ .......................... G06F 15/20; B60T 8/10
[52] U.S. Cl. ...................................... 364/426; 303/94; 180/197
[58] Field of Search ................... 364/426; 303/94-96, 303/98, 102, 103, 109; 188/181 C; 180/197

[56] References Cited

U.S. PATENT DOCUMENTS

| | | | |
|---|---|---|---|
| Re. 30,763 | 10/1981 | Hirzel et al. | 303/109 |
| 3,754,797 | 8/1973 | Rodi et al. | 303/96 |
| 3,802,529 | 4/1974 | Burckhardt et al. | 180/197 |
| 3,825,306 | 7/1974 | Fink | 303/105 |
| 3,825,799 | 7/1974 | Matsumura | 303/109 |
| 4,053,188 | 10/1977 | Jonner | 303/109 |
| 4,066,300 | 1/1978 | Devlin | 303/96 |
| 4,260,199 | 4/1981 | Reinecke | 303/96 |
| 4,344,139 | 8/1982 | Miller et al. | 364/426 |
| 4,361,871 | 11/1982 | Miller et al. | 364/426 |
| 4,395,761 | 7/1983 | Sato et al. | 364/426 |
| 4,439,832 | 3/1984 | Sato et al. | 364/426 |
| 4,446,522 | 5/1984 | Sato et al. | 303/106 |

Primary Examiner—Gary Chin
Attorney, Agent, or Firm—Stephen L. Noe

[57] ABSTRACT

Anti-wheel spin control systems are useful, for example, in industrial off-road vehicles. It is desirable that such systems operate automatically and not be unduly influenced by false slip signals caused by steering of the vehicle. It is further desirable that the operability of the control be readily determined by the operator. The instant anti-spin control includes an apparatus for producing a slip signal having a value responsive to the difference in rotational velocity between the vehicle wheels, and for producing a test signal. A processor receives the slip signal and test signal, compares the slip signal value with a first predetermined reference value in response to receiving the slip signal in the absence of the test signal, and compares the slip signal value with a second predetermined reference value in response to receiving both the slip signal and the test signal. A brake control signal is produced in response to the slip signal value exceeding the compared reference value, and the braking mechanism corresponding to the slipping wheel is activated. In a second embodiment of the invention, a steer signal is also produced and applied to the processor. The steer signal is utilized to negate the effect of steering the vehicle on the produced slip signal. Thus, the disclosed anti-spin system accounts for false slip indications produced by steering the vehicle, and provides a ready means for the operator to test the operability of the control system.

16 Claims, 5 Drawing Figures

MULTIPLE THRESHOLD WHEEL SLIP CONTROL APPARATUS AND METHOD

TECHNICAL FIELD

This invention relates generally to wheel slip control systems for vehicles having differentially driven wheels in which slip is controlled by application of a braking force to the slipping wheel, and, more particularly, to an apparatus and method having multiple wheel slip threshold levels.

BACKGROUND ART

It is well-known that vehicles having spaced apart drive wheels or wheel-sets powered by a single engine through a differential mechanism, are problematic when one of the differentially driven wheels or wheel-sets loses traction. Conditions which give rise to a loss of traction commonly exist in construction sites and other off-road locations. A vehicle having one of two differentially driven wheels or wheel-sets on a slippery surface and the other on a surface providing good traction is often unable to move, owing to the fact that the differential directs full engine power to the wheel having no traction. The result is a slip condition in which the wheel having no traction rotates at higher than normal speed and the wheel having traction remains stationary.

To alleviate such problems, various mechanical anti-spin devices have been developed and placed in commercial use. Such mechanical devices have been proven to have various problems, especially during cornering of a vehicle. Some devices fail to accommodate the normal wheel speed differential which arises during a turn, causing excessive tire wear owing to the dragging of the radially outer wheel or wheel-set.

Other devices drive only the slower wheel in a turn, making the vehicle hard to steer and applying excessive torque to the wheel being driven, often causing failure of the final drive.

An alternative approach involves the provision of separately actuatable drive wheel brakes. An operator selectively applies a braking force to the spinning or slipping wheel, and effects a balancing of power through the differential mechanism. The application of the braking force to the slipping wheel simulates increased traction and results in a more even distribution of power between the differentially driven wheels. This approach is commonly used on farm vehicles.

A more sophisticated approach to the just described system, utilizes electronics to supply the braking force to the slipping or spinning wheel. An effective example of this approach is described in U.S. Pat. No. 4,344,139, issued to Miller et al. on Aug. 10, 1982, and assigned to the assignee of this invention. Miller discloses an apparatus for applying a proportionally varying braking force to the wheel which loses traction, during a slip control time period. A slip signal is produced corresponding to any difference between the rotational velocity of the differentially driven wheels, and the slip signal is compared with a predetermined reference signal. In response to the slip signal exceeding the reference signal, the system selectively applies a braking force to the faster turning wheel. The braking force is modulated proportionally according to the degree of slip represented by the slip signal.

One problem with the various prior control systems involves the normal difference in rotational velocities of the inner and outer vehicle wheels encountered while cornering. To avoid this problem, a fully automatic system, such as that described by Miller, must establish the reference signal at a level higher than the maximum slip signal that is produced solely in response to cornering the vehicle. Thus, the automatic control is inhibited for small values of wheel slip. Other prior systems have eliminated the problem completely by providing only manual operation. These controls rely on the operator to activate the anti-slip control when he senses the need to do so. Such manual systems necessarily eliminate much of the advantage of an anti-slip control. A further problem with the fully automatic systems is the inability of the operator to determine the operational status of the anti-spin control prior to encountering an actual slip condition.

The present invention is directed to overcoming one or more of the problems as set forth above.

DISCLOSURE OF THE INVENTION

In one aspect of the present invention, an anti-spin apparatus for controllably equalizing the power delivered through a differential mechanism to at least two wheels of a vehicle is provided. The vehicle has a steering mechanism and each of the wheels has a respective braking mechanism. The apparatus produces a slip signal having a value responsive to the difference in rotational velocity between the wheels. A test signal is also controllably produced. A processor receives the slip signal and test signal, compares the slip signal value with a first reference value in response to receiving the slip signal in the absence of the test signal, and with a second reference value in response to receiving both the slip signal and the test signal. A brake control signal is produced in response to the slip signal value exceeding the compared reference value, and the braking mechanisms are controllably operated in response to the brake control signal.

In a second aspect of the present invention, apparatus is provided for supplying a steer signal to the processor means. The steer signal value varies in response to the position of the steering mechanism. The processor controllably negates the effect on the anti-spin apparatus of steering the vehicle, in response to receiving the steer signal in the absence of the test signal.

In another aspect of the present invention, a method for controllably equalizing the power delivered through a differential mechanism to at least two wheels of a vehicle is provided. The vehicle has a steering mechanism and each of the wheels has an associated braking mechanism. A slip signal responsive to a difference in the rotational velocity between the wheels is produced. A test signal responsive to the position of a test switch is also produced. A first reference value is produced in the absence of receiving the test signal and a second reference value is produced in response to receiving the test signal. The slip signal value is compared with the first reference value in response to receiving the slip signal in the absence of the test signal and to the second reference value in response to receiving both the slip signal and the test signal. A brake control signal is produced in response to the slip signal value exceeding the compared reference value, and the braking mechanisms are controllably operated in response to the brake control signal.

The present invention advantageously compares the slip signal with multiple reference signals, thus avoiding problems associated with prior control systems.

BRIEF DESCRIPTION OF THE DRAWINGS

For a better understanding of the present invention, reference may be made to the accompanying drawings, in which.

BEST MODE FOR CARRYING OUT THE INVENTION

Figure 1:
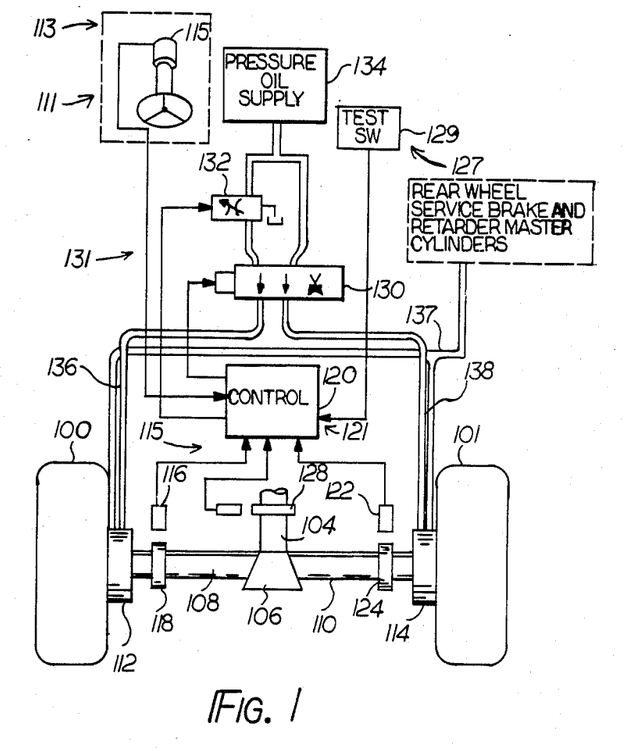
FIG. 1 is a diagram of a vehicle drive system including an anti-slip control in accordance with an embodiment of the present invention.

Referring first to FIG. 1, an anti-slip apparatus embodying certain of the principles of the present invention is illustrated. It should be understood that the following detailed description relates to the best presently known embodiments of the apparatus. However, the apparatus can assume numerous other embodiments, as will become apparent to those skilled in the art, without departing from the appended claims.

Wheels 100,101 are driven by an engine (not shown) through an input or drive shaft 104, a differential mechanism 106, and respective half-axles 108 and 110. A steering mechanism 111 is coupled to steerable wheels (not shown) of the vehicle. The drive system is conventional and no further details need be disclosed for an understanding of the present invention.

The wheels 100,101 are stopped by spring engaged parking brake pistons, or by hydraulically engaged service brake pistons, of brake mechanisms 112,114. The brakes are spring biased in the engaged position and are maintained in the disengaged position by application of fluid pressure, as disclosed in U.S. Pat. No. 3,927,737, issued Dec. 23, 1975 to P. F. M. Prillinger and assigned to the assignee of this invention. The service brakes are normally actuated via a service brake line 137 connected to the service brake and retarder master cylinders (not shown). The service brake system is well-known and does not form a part of this invention. The brakes are also actuated through the parking brake lines 136,138 as described in detail below.

Means 115 produces a slip signal having a value responsive to the difference in rotational velocity between the wheels 100,101. The slip signal producing means 115 includes a left wheel speed pick up in the form of an electromagnetic transducer 116 which provides pulses in cooperation with a gear-like device 118. The device 118 is mounted on and rotates with the axle portion 108. Signals from the transducer 116 are applied to one input of an electronic controller 120, the details of which are described below. In a similar manner, right wheel speed signals are provided by a transducer 122 operated in conjunction with a gear-like device 124 which rotates with the axle portion 110. Signals from the transducer 122 are applied to another input of the electronic controller 120. Each of the transducers 116,122 produce respective signals having values responsive to the rotational speed or velocity of the wheels 100,102. Additionally, a drive shaft speed signal is produced by a transducer 126 in conjunction with a gear-like device 128 which rotates with the drive shaft 104. The drive shaft speed signals are applied to a third input of the electronic controller 120. Each of the transducers 116,122,126 is preferably an electromagnetic device which produces a pulse type, time variable output voltage. Such transducers are well-known in the art. However, other transducers, such as optical and Hall effect devices, may be employed as alternatives. Means 127 for producing a test signal is also connected to an input of the electronic controller 120. The test signal producing means 127 is preferably a manual switch 129.

The electronic controller 120 is part of a processor means 121 for receiving the slip signal and producing a brake control signal in response to the slip signal value exceeding a compared reference value. A means 131 receives the brake control signal and controllably operates the braking mechanisms 112,114 in response to the received brake control signal.

A second embodiment of the present invention includes means 113 for producing a steer signal in response to the position of the steering mechanism 111. The steer signal is delivered to the controller 120. Means 113 preferably includes a potentiometer 115 controllably connected to the steering mechanism 111. The output of the potentiometer 115 is a signal having a value that varies over a negative to positive voltage range, in response to the position of the steering mechanism 111. Other suitable angular position transducers may be substituted for the potentiometer 115 in the means 113, as is well-known in the art.

In both embodiments, the controller 120 operates upon the signal inputs, determines the existence, magnitude, and location of wheel slip during a loss of traction situation, and distinguishes between true wheel slip and a transducer failure. In response to detecting a true slip condition, the power transfer between the two differentially driven wheels 100,102 is balanced by applying a proportional braking force to the wheel which loses traction. This is accomplished by means of locating selection valve 130 and proportioning valve 132, both of which are included in the means 131.

The valves 130,132 operate in combination with a supply 134 of oil or brake fluid under pressure, the fluid lines from supply 134 running both through and around the proportioning valve 132 to the solenoid operated selection valve 130 which directs full pressure to one of the brake mechanisms 112,114, and modulated or proportionally controlled pressure to the other of the brakes 112,114. Note that, owing to the utilization of spring biased brakes 112,114, brake pressure is the inverse of fluid pressure and is applied by relieving the fluid pressure in one of the two brake lines 136,138, and could be straightforwardly implemented in the opposite fashion, increasing brake pressure in direct rather than inverse ratio to the applied fluid pressure.

Figure 2:
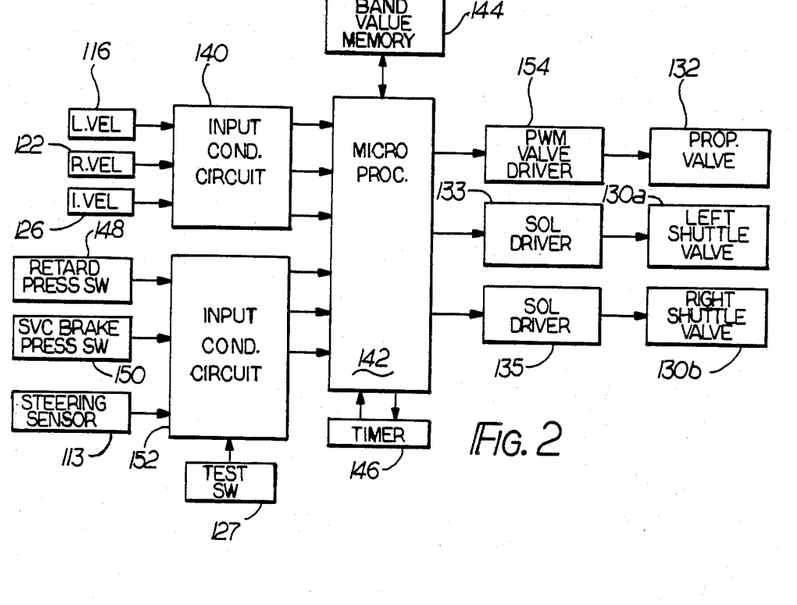
FIG. 2 is a block diagram of an embodiment of the present invention.

FIG. 2 is a block diagram of the preferred implementation of the anti-spin apparatus described above. A solid state digital microprocessor 142 performs system control functions. The microprocessor 142 is programmed to establish a plurality of slip value bands, each band having associated therewith an applied brake force value expressed in terms of fluid pressure. The microprocessor 142 is interconnected with a band value memory 144 and a timer 146. Transducers 116,122,126 are connected to the microprocessor 142 through an input conditioning circuit 140. The input circuit 140 provides appropriately digitized input signals to the microprocessor 142. Retard brake pressure and service brake pressure switches 148,150 are likewise connected through an input conditioning circuit 152 to the microprocessor 142. The test signal producing means 127 is also connected to the microprocessor 142 through the input circuit 152. Finally, in the alternative embodiment, the steer signal producing means 113 is connected to the microprocessor 142 through the input circuit 152.

A first output of the microprocessor 142 is connected through a pulse-width modulated servo valve driver 154 to the servo operated proportioning valve 132. A second output from the microprocessor 142 is connected to the solenoid driver 133 associated with a left direction selection valve 130a, and a third output from the microprocessor 142 is connected through the solenoid driver 136 to a right direction shuttle valve 230b. The pulse width modulated servo valve driver 154 proportionally controls the servo valve 132, in a manner well-known in the art. Therefore, adverting momentarily to FIG. 1, fluid pressure is modulated via the proportioning valve 132 to the brake line 136,138 selected by the position of the valve 130.

Figure 3A:
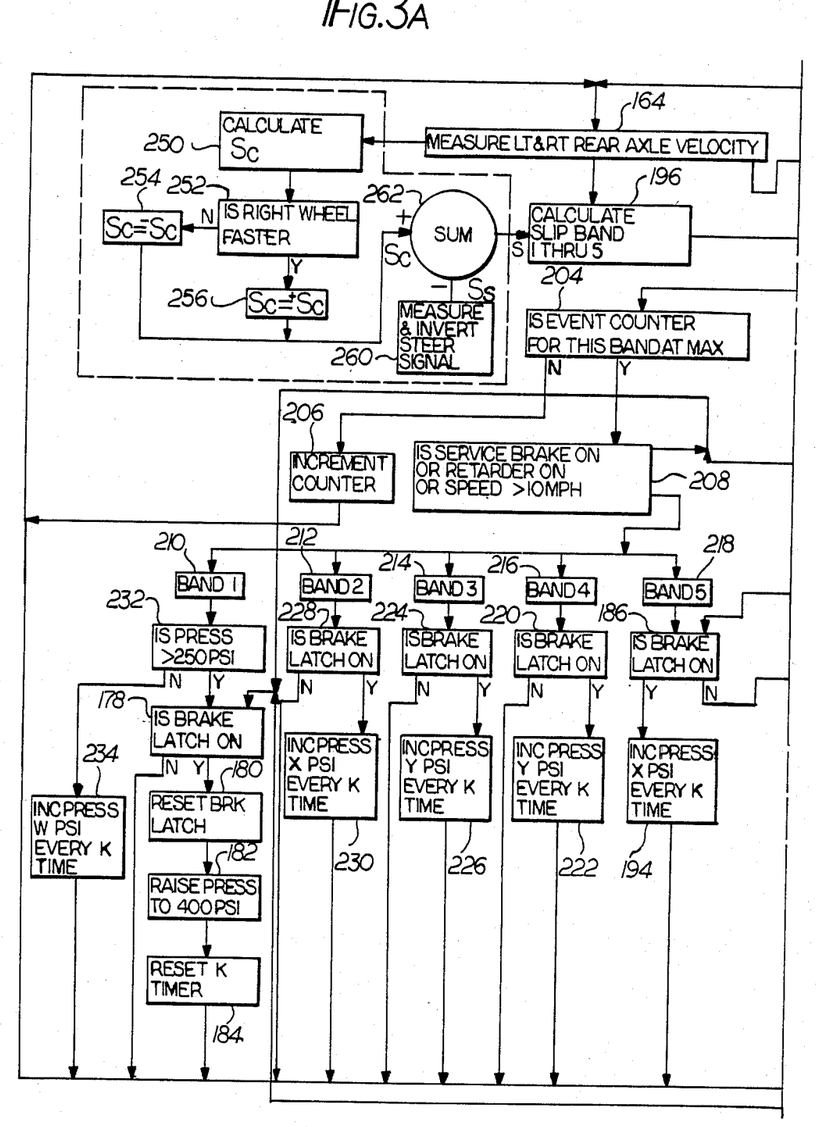
FIGS. 3A and 3B are a functional flow diagram utilized with the embodiment of FIG. 2; and, FIG. 4 is a graphical representation utilized in describing the operation of the embodiment of FIG. 2.
Figure 3B:
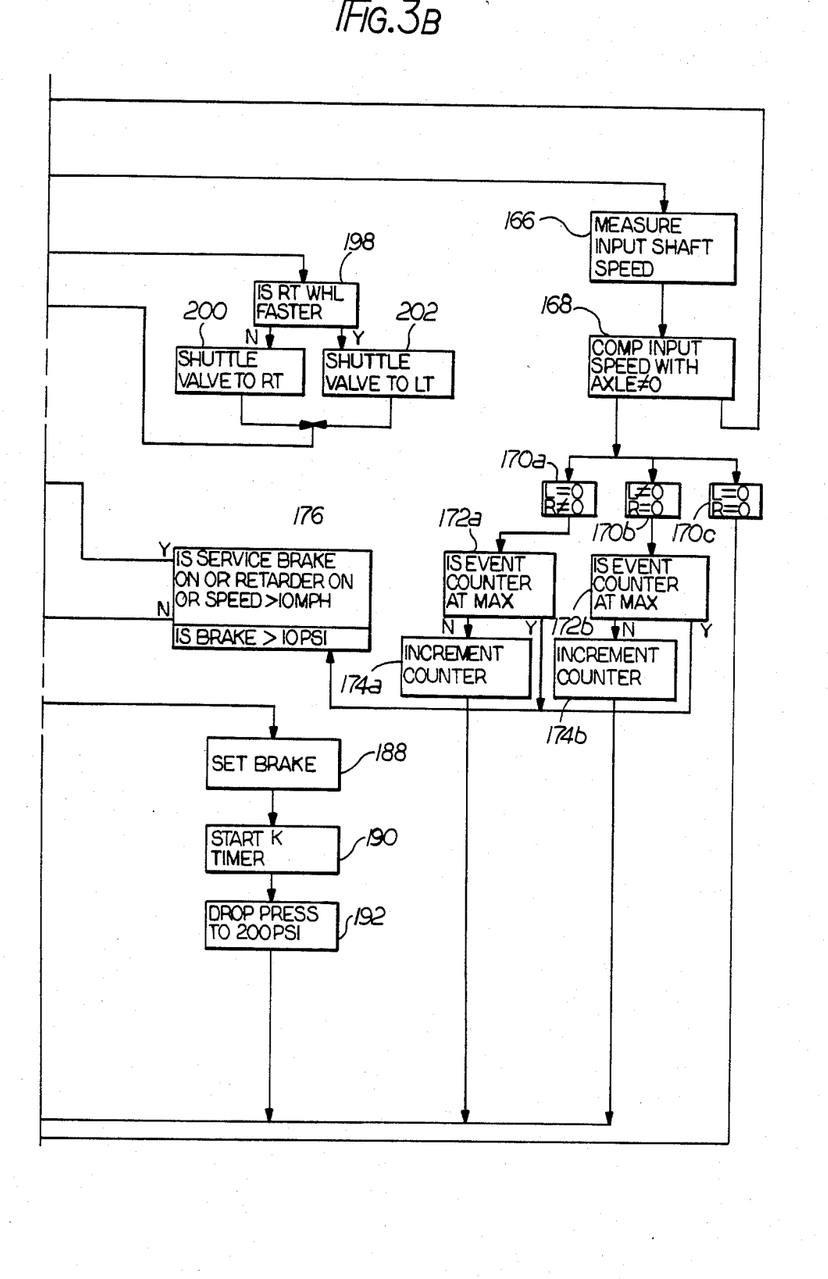

Referring now to FIG. 3, a functional flowchart defining the internal programming for the microprocessor 142 is shown. From this flowchart, a programmer of ordinary skill can develop a specific set of program instructions for a general purpose microprocessor that defines the necessary slip signal value bands, timing cycles, and brake fluid pressure values necessary for implementation of the instant invention. It will be appreciated that, while the best mode of the invention is considered to comprise a properly programmed microprocessor 142, the result of which is the creation of novel hardware associations within the microprocessor 142 and its associated devices, it is possible to implement the instant invention utilizing traditional hard wired circuits.

INDUSTRIAL APPLICABILITY

Figure 4:
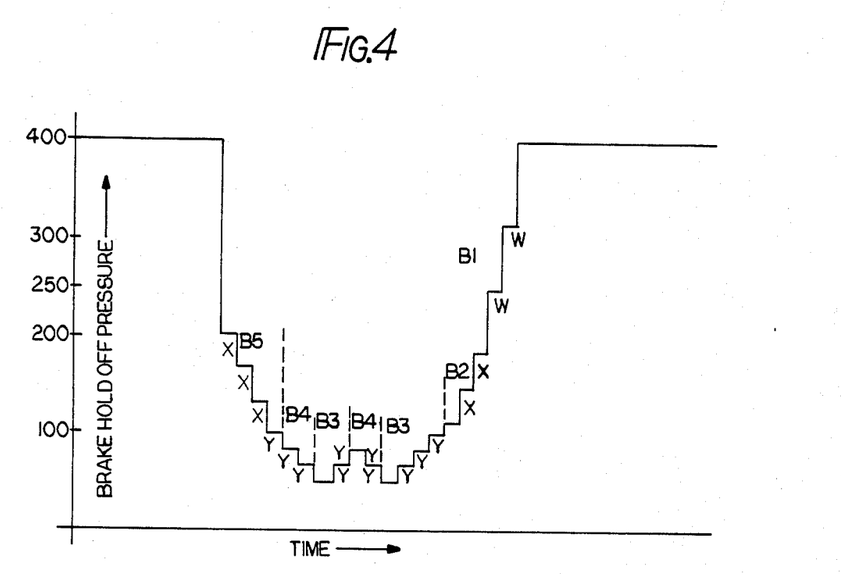

The following description refers to FIGS. 1, 2, and 4, and to the flowchart depicted in FIG. 3. The operation of the anti-spin apparatus is first described according to the embodiment in which the steer signal producing means 113 is absent from the apparatus. The initial discussion further assumes that the test signal producing means 127 is in the "non-test" or "normal" position.

Data delivered by the transducers 116,122 is sampled in block 164 of FIG. 3. In response to one of the wheel velocity signals being equal to zero, control progresses along the right side of the flow diagram to block 166. The input shaft speed is determined in block 166, and is compared in block 168 with the non-zero wheel velocity. If the ratio of the non-zero wheel velocity to drive shaft speed is equal to or less than a constant, for example, 1.5, it is assumed that the wheel indicating zero speed is actually turning and that the zero indication is the result of a failed transducer. In this case, the program returns to the original starting point and, if desired, an indication of the apparent transducer failure can be presented to the operator. The value of the constant selected is determined according to the gear ratio of the differential mechanism 106. As a matter of convenience for purposes of this discussion, a differential ratio of 1:1 is assumed throughout.

If the rotating wheel velocity is greater than 1.5 times the drive shaft speed, the program progresses to blocks 170a,b,c. If one of the wheel velocities is not zero, the program progresses to blocks 172a,b, which is an event counter requiring several successive cycles of the above conditions prior to activation of the anti-spin apparatus. This delay filters out short term wheel speed aberations and has been found to be advantageous for efficient system operation. If the event counter has not incremented or counted a sufficient number of cycles, the program progresses to blocks 174a,b which increment the counter. The program then returns to the original starting point.

Once the event counter 172a,b has incremented a sufficient number of cycles, the program progresses to block 176. In block 176 a determination is made of the input switch conditions controlling the service brake, the retarder, and/or the vehicle speed. It is additionally advisable to check the condition of brake fluid pressure at this point.

If both wheel velocities are zero, block 170c advances the program to blocks 178,180,182,184, releasing the parking brake 112,114 and resetting the timer 146. The same result occurs if automatic control is contraindicated in block 176.

If block 176 is satisfied, the program progresses to block 186 to determine whether the slip control system is activated. If so, the effect is the same as entering band 5, the most severe slip condition band, and control passes to block 194. Block 194 increases the wheel brake force by decreasing the wheel brake hold off pressure by an increment X, for each timed interval established by the microprocessor timer 146. If the slip control system is not operative in block 186, the program progresses to block 188 which activates the system, and then through blocks 190 and 192 to begin the timing cycle and reduce the brake hold off pressure to a value just sufficient to maintain the brakes in the released position. On the next pass through the above sequence, a positive result will be obtained at block 186, and in block 194 the brake hold off pressure will be decreased by X psi. The control repeats this sequence at timed intervals until either the zero speed wheel begins to turn or the brake hold off pressure is decremented to nearly zero psi. In the latter case, the brakes are then released completely. In the former case, the control follows the path from block 164 to block 196, and continues as described in the following paragraphs.

Assuming that, in block 164, neither wheel velocity is found to equal zero, the program branches to block 196, representing a calculation sub-routine. Essentially, block 196 determines the location of the actual slip signal value within one of five slip bands represented by Table 1. The slip bands are contiguous, the upper limit of one band being the lower limit of the next, with the highest slip value being the first predetermined reference value referred to above. The first predetermined reference value must be exceeded by the slip control signal value before anti-slip control begins. The processor means 121 makes this determination by comparing the slip signal value with the first predetermined reference value, and with the other reference values shown in Table 1.

Since normal cornering of the vehicle produces an apparent slip condition, with the radially outer wheels of the vehicle rotating faster than the radially inner wheels, to prevent actuation of the anti-slip control in response to maneuvering the vehicle while operating in this mode, the first reference value must be established higher than the maximum slip signal value produced by steering the vehicle in a hard cornering maneuver. This value varies according to the design of the vehicle. As shown in Table 1, for purposes of this discussion, a value of 1.7 is considered to be greater than the maximum slip signal value produced by steering the vehicle.

Continuing through the program of FIG. 3, program blocks 198,200,202 represent the determination of which of the wheels is rotating at a higher velocity, and the disposition of the valve 130 to direct modulated brake fluid pressure to the highest velocity wheel and unmodulated brake fluid pressure to the lower velocity wheel (remembering the inverse relationship between brake pressure and brake fluid pressure). The program then advances to block 204 and determines whether a sufficient slip time period has elapsed to begin operation of the control system. If insufficient time has elapsed, program block 206 increments a counter and the program advances to the starting point. If sufficient time has elapsed, the program advances to block 208 in which the various signal conditions which might contra-indicate operation of the slip control system are considered. If the conditions are satisfied, the program advances to the appropriate one of the blocks 210,212,214,216,218, as determined in block 196. Initially, the vehicle can enter the slip control mode only via band 5. Therefore, the slip value must exceed the first predetermined reference value, for example, 1.7. This prevents unintentional activation of the control system while steering the vehicle. Once the control mode has been entered through band 5, control is exited by sequencing through the lower bands 4-1, producing a smooth transition back to the uncontrolled mode.

Assuming that band 5 is entered, and that a positive indication is reached in block 186, the brake force is periodically incremented in block 194 by reducing the brake pressure by the increment X for every timing cycle, until the slip signal value causes entry into another slip band. This is best seen in FIG. 4, where the first step from the hold off pressure of 400 psi represents an abrupt reduction in pressure to 200 psi, followed by three additional incremental reductions of approximately 33 psi each, increasing the parking brake force through spring action with each incremental step.

Next, the slip condition in the example represented in FIG. 4 enters band 4, in which the slip has been reduced to the point where the slip signal value is within the range between 1.5 and 1.7. Blocks 220,222 cause the brake force to be increased by a smaller increment Y for every timing cycle. Accordingly, the system approaches the full brake force condition in a gradual curve, with the brake force increments becoming smaller toward the full brake force condition.

As is also represented in FIG. 4, reaching a lower slip band value and qualifying for successive entry into slip bands 3,2,1, causes gradually increasing incremental reductions in brake force until the system is back to the unbraked condition represented by application of the full brake fluid pressure of 400 psi. Preferably, band 3 is the mirror image of band 4, and causes incremental reductions in braking force through incremental increases in brake fluid pressure. Band 2 is the mirror image of band 5, and causes large incremental reductions in brake force. Band 1 has no counterpart, and causes still larger reductions in brake force as represented by the increment W in the diagram of FIG. 4.

From the foregoing it is apparent that, with the test signal producing means 127 in the "normal" mode, the anti-spin apparatus operates to detect a slipping wheel, to apply braking force to the slipping wheel, and to periodically and incrementally modulate the brake force either positively or negatively in accordance with the degree of slip which is detected by the system. Conditions giving rise to a slip signal value of 1.7 or less do not cause entry into the slip control mode, because the first predetermined reference value is not exceeded. This prevents unintentional operation of the anti-spin control owing to steering of the vehicle. However, actual slip that does not exceed the first predetermined reference value is likewise not corrected for by the control system.

The utility of the test signal producing means 127 is now described. When the test switch 129 is moved from the "normal" to the "test" position, the first predetermined reference value is replaced by a second predetermined reference value. For example, as is shown in Table 1, the reference value required to enter slip band 5 is reduced from the first value of 1.7 to the second or modified value of 1.25. Band values 4-1 are likewise reduced. These are the values stored in the band value memory 144 and utilized in the calculation of block 196. Therefore, in response to selecting the "test" mode, the processor means 121 receives the slip signal and the test signal and compares the slip signal with the second predetermined reference value. Anti-slip control is thus initiated in response to a slip signal value less than the slip signal produced by steering the vehicle. This produces two important results.

First, the operator can readily determine whether or not the anti-spin apparatus is functioning properly by merely steering the vehicle into a hard turn. If the slip control is operating properly, the operator can observe the application of the vehicle brake 112,114 to the radially outer of the differentially driven wheels 100,101, in response to the slip signal value produced by steering the vehicle exceeding the modified threshold value. Thus, it is relatively easy for the operator to determine the operability of the control system prior to encountering a low traction situation.

Second, when the operator encounters slippery working conditions in which it is desirable that the anti-spin control system respond in a rapid fashion, he can select the "test" position with the test switch 129. This causes the control system to enter the slip control mode with the lower slip signal value, making it more sensitive to low traction conditions, and enhancing controllability of the vehicle. Since this mode of operation is selected only under a particular set of extreme circumstances, the interference with normal steering functions is minimal and acceptable.

The alternative embodiment of the anti-spin apparatus, in which the steer signal producing means 113 is included, as shown within the dotted area of FIG. 3, is a further enhancement of the control system. In one implementation of this embodiment, the processor means 121 receives the steer signal and controllably modifies the slip signal value in response to the value of the steer signal, in the absence of the test signal. Assuming that the test switch 129 is in the "normal" position, and that neither wheel velocity is found to be zero in block 164, program control progresses to block 250, in which a slip value is calculated as $S_c$.

The sign of $S_c$ is determined in the blocks 252,254,256. If the right wheel is the faster of the two wheels, the quantity $S_c$ is positive, and if the right wheel is not the faster of the two wheels, the quantity $S_c$ is negative. $S_c$ is next delivered to block 262. The inverted steer signal value $S_s$ is delivered from the block 260, and also supplied to the block 262. The signals $S_c$ and $S_s$ are summed and delivered to the block 196, in which the appropriate slip band is calculated and control progresses as described above. As shown in Table 1, the slip band reference or threshold values utilized by the control system are much lower as applied to the instant embodiment of the invention, than the values utilized in the embodiment having no steer input signal.

For example, assume that the steer signal producing means 113 supplies a positive signal to block 260 in response to steering the vehicle in a left turn, and a negative signal in response to steering the vehicle in a right turn. In response to the vehicle executing a right turn, the left or radially outer wheels 100,101 rotate at a higher velocity than do the right or radially inner wheels. Assuming a "no-slip" or good traction condition, $S_c$ is calculated in block 250 and negative $S_c$ is delivered from block 254 to block 262. The steer signal polarity is inverted in block 260 and the signal is delivered as a positive signal to block 262, effectively canceling the false slip signal caused by turning the vehicle, thus preventing entry into the control mode.

Now, given a similar hypothetical situation but under poor traction conditions, assume that the left wheel loses traction. The calculated slip signal $S_c$ becomes larger, as does the absolute value of the negative signal delivered to block 262. Since the steer signal delivered to block 262 modifies but no longer cancels the slip signal, the true slip condition is detected and is delivered to block 196. In response to this signal exceeding the first predetermined reference signal, shown in Table 1, band 5 of the control mode is entered and slip control commences.

Finally, under the same hypothetical conditions, assume that the left wheel maintains traction and the right wheel loses traction. The calculated slip signal $S_c$ becomes smaller or passes through zero and becomes larger, as the relative wheel velocities change. Correspondingly, the negative signal delivered to block 262 becomes less negative or goes positive and is modified but no longer canceled by the steer signal, and the control mode is entered once the first predetermined reference value is exceeded.

The consequences of other combinations of wheel slip and steering angle can be readily determined by applying the above described logic.

In a second implementation of this embodiment, the processor means 121 accomplishes the same result as that just described, by continuously modifying the band threshold values in response to receiving the steer signal in the absence of the test signal. The first predetermined reference value is continuously maintained a predetermined amount greater than the actual slip signal value produced in response to steering the vehicle.

Adding the steer signal producing means 113 to the anti-spin control system accounts for differences in wheel velocity caused solely by steering the vehicle, and prevents such wheel velocity differences from appearing to the control as an actual slip condition. By negating the effect of steering on operation of the control, the anti-spin system is made extremely sensitive to small slip conditions that prior systems are unable to automatically contend with. Keeping the above principles in mind, and having the flexibility of a programmable microprocessor, one skilled in the art can produce other related methods of accomplishing this same result.

In the steer signal embodiment, switching the test signal producing means 127 to the "test" mode inhibits the action of the steer signal producing means 113 and causes the control to operate on the second predetermined reference value, as fully described above. Thus, in each embodiment, the anti-spin control system can be tested by steering the vehicle in a hard turn while the test signal producing means 127 is in the "test" mode. Of course, if the test mode is not provided in the second embodiment, the control mode will never be entered solely in response to steering the vehicle.

It will be appreciated by those skilled in the art that it is not essential to incorporate all of the steps represented in the flowchart of FIG. 3 in a given system, nor is it necessary to incorporate the steps of FIG. 3 utilizing a microprocessor.

However, such an implementation is deemed to be the best mode of practicing the invention owing to the broad and widespread availability of suitable microprocessor circuits, the widespread understanding of programming techniques for such microprocessors, the cost reduction in such circuitry which has been realized in recent years, and the flexibility which a programmable device affords.

Other aspects, objects, advantages and uses of this invention can be obtained from a study of the drawings, the disclosure, and the appended claims.

TABLE 1

| | BAND THRESHOLD REFERENCE VALUES $S$ = SLIP SIGNAL VALUE | | |
|---|---|---|---|
| BAND | "NORMAL" MODE | "TEST" MODE | STEER SIGNAL MODE |
| 1 | $1.0 < S <= 1.2$ | $1.0 < S <= 1.1$ | $1.0 < S <= 1.1$ |
| 2 | $1.2 < S <= 1.3$ | $1.1 < S <= 1.15$ | $1.1 < S <= 1.15$ |
| 3 | $1.3 < S <= 1.4$ | $1.15 < S <= 1.2$ | $1.15 < S <= 1.2$ |
| 4 | $1.4 < S <= 1.7$ | $1.2 < S <= 1.25$ | $1.2 < S <= 1.25$ |
| 5 | $1.7 < S$ | $1.25 < S$ | $1.25 < S$ |

We claim:

1. An anti-spin apparatus for controllably equalizing the power delivered through a differential mechanism (106) to at least two wheels (100,101) of a vehicle, said vehicle having a steering mechanism (111) and each of said wheels (100,101) having a respective braking mechanism (112,114), said apparatus comprising:
   means (115) for producing a slip signal having a value responsive to the difference in rotational velocity between said wheels (100,101);
   means (127) for producing a test signal;
   processor means (121) for receiving said slip signal and said test signal, comparing said slip signal value with a first predetermined reference value in response to receiving said slip signal in the absence of said test signal, comparing said slip signal value with a second predetermined reference value in response to receiving said slip signal and said test signal, and producing a brake control signal in response to said slip signal value exceeding the compared one of said first and second predetermined reference values; and
   means (131) for receiving said brake control signal and controllably operating said braking mechanisms (112,114) in response to said received brake control signal.

2. An anti-span apparatus, as set forth in claim 1, wherein said first predetermined reference value is greater than the largest value of said slip signal produced in response to steering said vehicle, and said second predetermined reference value is less than the largest value of said slip signal produced in response to steering said vehicle.

3. An anti-spin apparatus, as set forth in claim 1, wherein said test signal producing means is a manual switch.

4. An anti-spin apparatus, as set forth in claim 3, wherein said slip signal producing means includes respective wheel speed transducers connectable to each of said vehicle wheels and adapted to produce respective signals having values responsive to the rotational velocity of said wheels.

5. An anti-spin apparatus, as set forth in claim 1, including means for producing a steer signal in response to the position of said steering mechanism.

6. An anti-spin apparatus, as set forth in claim 5, wherein the value of said steer signal varies in response to the position of said steering mechanism.

7. An anti-spin apparatus, as set forth in claim 6, wherein said processor means receives said steer signal and controllably modifies said slip signal value in response to the value of said steer signal, in the absence of said test signal.

8. An anti-spin apparatus, as set forth in claim 7, wherein said slip signal value is controllably reduced by an amount equal to said steer signal value.

9. An anti-spin apparatus, as set forth in claim 7, wherein said slip signal value is free from being modified in response to said processor means receiving said test signal.

10. An anti-spin apparatus, as set forth in claim 6, wherein said processor means receives said steer signal and said test signal, and controllably modifies said first predetermined reference value in response to receiving said steer signal in the absence of said test signal.

11. An anti-spin apparatus, as set forth in claim 10, wherein said modified reference value is maintained a predetermined amount greater than the actual slip signal value produced in response to steering said vehicle.

12. A vehicle anti-spin system, comprising:
   a vehicle power source;
   a differential mechanism (106) connected to said power source;
   first and second wheels (100,101) connected to said differential mechanism (106);
   a respective braking mechanism (112,114) connected to each of said wheels (100,101);
   a steering mechanism (111) connected to said vehicle;
   means (115) for producing a slip signal having a value responsive to the difference in rotational velocity between said wheels (100,101), said slip signal producing means (115) including respective wheel speed transducers (116,122) connected to each of said vehicle wheels (100,101);
   a switch (129) connected to said vehicle and adapted to produce a test signal;
   processor means (121) for receiving said slip signal and said test signal, comparing said slip signal value with a first predetermined reference value in response to receiving said slip signal in the absence of said test signal, said first predetermined reference value being greater than the largest value of said slip signal produced in response to steering said vehicle, comparing said slip signal value with a second predetermined reference value in response to receiving said slip signal and said test signal, said second predetermined reference value being less than the largest value of said slip signal produced in response to steering said vehicle, and producing a brake control signal in response to said slip signal value exceeding the compared one of said first and second predetermined reference values; and
   means (131) for receiving said brake control signal and controllably operating said braking mechanisms (112,114) in response to said received signal.

13. An anti-spin apparatus, as set forth in claim 12, including means for producing a steer signal having a value that varies in response to the position of said steering mechanism.

14. An anti-spin apparatus, as set forth in claim 13, wherein said processor means receives said steer signal and said test signal, and controllably maintains said first predetermined reference value a predetermined amount greater than the slip signal value produced in response to steering said vehicle, in the absence of said test signal.

15. An anti-spin apparatus, as set forth in claim 13, wherein both of said first and second predetermined reference values are less than the largest value of said slip signal produced in response to steering said vehicle, and said processor means receives said steer signal and controllably reduces said slip signal value by an amount equal to said steer signal value, in the absence of said test signal.

16. A method for controllably equalizing the power delivered through a differential mechanism (106) to at least two wheels (100,101) of a vehicle, each of said wheels (100,101) having an associated braking mechanism (112,114) and said vehicle including a steering mechanism (111), comprising the steps of:
   (A) producing a slip signal in response to a difference in the rotational velocity between said wheels (100,101);
   (B) producing a test signal in response to the position of a test switch (129);
   (C) receiving said slip signal and said test signal;
   (D) producing a first reference value in the absence of said test signal and a second reference value in response to receiving said test signal;
   (E) comparing said slip signal value with said first predetermined reference value in response to receiving said slip signal in the absence of said test signal;
   (F) comparing said slip signal value with said second predetermined reference value in response to receiving said slip signal and said test signal;
   (G) producing a brake control signal in response to said slip signal value exceeding the compared one of said first and second predetermined reference values; and
   (H) controllably operating said braking mechanisms (112,114) in response to said brake control signal.

* * * * *